(12) United States Patent
Kim et al.

(10) Patent No.: US 10,641,666 B2
(45) Date of Patent: May 5, 2020

(54) PRESSURE SENSOR (71) Applicant: LG INNOTEK CO., LTD., Seoul (KR)

(72) Inventors: Bi Yi Kim, Seoul (KR); Jeong Han Kim, Seoul (KR); Hyun Gyu Park, Seoul (KR); Won Keun Cho, Seoul (KR); In Hee Cho, Seoul (KR); Hyun Jin Jo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/756,821

(22) PCT Filed: Sep. 2, 2016

(86) PCT No.: PCT/KR2016/009876
§ 371 (c)(1),
(2) Date: Mar. 1, 2018

(87) PCT Pub. No.: WO2017/039401
PCT Pub. Date: Mar. 9, 2017

(65) Prior Publication Data
US 2018/0266900 A1   Sep. 20, 2018

(30) Foreign Application Priority Data
Sep. 3, 2015  (KR) .................. 10-2015-0125076

(51) Int. Cl.
*G01L 1/18* (2006.01)
*D03D 15/00* (2006.01)
(Continued)

(52) U.S. Cl.
CPC ............... *G01L 1/18* (2013.01); *B32B 5/024* (2013.01); *D03D 1/0088* (2013.01); *D03D 11/00* (2013.01);
(Continued)

(58) Field of Classification Search
CPC ..... G01L 1/18; G01L 5/10; G01L 5/03; B32B 2250/03; B32B 2250/40; B32B 2307/202;
(Continued)

(56) References Cited

U.S. PATENT DOCUMENTS 6,155,120 A * 12/2000 Taylor .................. A61B 5/1036
73/862.046
6,852,395 B2 * 2/2005 Dhawan ............... B01D 39/083
428/196

(Continued)

FOREIGN PATENT DOCUMENTS

| JP | 2008-12215 A | 5/2008 |
| KR | 10-2013-0118751 A | 10/2013 |
| KR | 10-1455239 B1 | 10/2014 |
| WO | WO-2011/162305 A1 | 12/2011 |

* cited by examiner

OTHER PUBLICATIONS

International Search Report in International Application No. PCT/KR2016/009876, filed Sep. 2, 2016.

*Primary Examiner* — Octavia Hollington
(74) *Attorney, Agent, or Firm* — Saliwanchik, Lloyd & Eisenschenk (57) ABSTRACT

A pressure sensor formed in a sheet type is provided, including conductive fibers, nonconductive fibers, and piezoresistive fibers, which are woven together, wherein the pressure sensor includes a first electrode layer including the conductive fibers and the nonconductive fibers, a second electrode layer including the conductive fibers and the nonconductive fibers, and a piezoresistive layer including the piezoresistive fibers and disposed between the first electrode layer and the second electrode layer.

20 Claims, 6 Drawing Sheets

(51) Int. Cl.
  *D03D 11/00* (2006.01)
  *B32B 5/02* (2006.01)
  *D03D 1/00* (2006.01)
  *H01C 10/10* (2006.01)

(52) U.S. Cl.
  CPC .......... *D03D 15/00* (2013.01); *B32B 2250/03* (2013.01); *B32B 2250/40* (2013.01); *B32B 2307/202* (2013.01); *B32B 2457/00* (2013.01); *D10B 2401/16* (2013.01); *H01C 10/10* (2013.01); *H01C 10/103* (2013.01)

(58) Field of Classification Search
  CPC .. B32B 2457/00; B32B 5/024; D03D 1/0088; D03D 15/00; D03D 11/00; H01C 10/10; H01C 10/103; D01B 2401/16
  USPC .............. 73/862.041, 862.627, 862
  See application file for complete search history.

(56) References Cited

U.S. PATENT DOCUMENTS

| | | | | |
|---|---|---|---|---|
| 8,661,915 | B2* | 3/2014 | Taylor | G01L 1/18 73/862.044 |
| 8,925,393 | B2* | 1/2015 | Cannard | D04B 1/14 73/862 |
| 9,448,127 | B2* | 9/2016 | Cannard | G01L 1/18 |
| 9,671,297 | B2* | 6/2017 | Sibbett | B25J 19/02 |
| 10,260,968 | B2* | 4/2019 | Merrell | G01L 1/04 |
| 10,400,364 | B1* | 9/2019 | Mayer | D03D 15/00 |
| 2002/0121146 | A1 | 9/2002 | Manaresi et al. | |
| 2005/0146076 | A1* | 7/2005 | Alexander | D03D 1/0088 264/257 |
| 2007/0202765 | A1* | 8/2007 | Krans | G06F 3/0414 442/301 |
| 2014/0150573 | A1 | 6/2014 | Cannard et al. | |
| 2015/0248159 | A1* | 9/2015 | Luo | G06F 3/014 345/156 |
| 2015/0294756 | A1* | 10/2015 | Ben Shalom | H01B 5/14 340/573.7 |

PRESSURE SENSOR

CROSS-REFERENCE TO RELATED APPLICATIONS

This application is the U.S. national stage application of International Patent Application No. PCT/KR2016/009876, filed Sep. 2, 2016, which claims priority to Korean Application No. 10-2015-0125076, filed Sep. 3, 2015, the disclosures of each of which are incorporated herein by reference in their entirety.

TECHNICAL FIELD

The present invention relates to a pressure sensor, and more particularly, to a sheet-type pressure sensor.

BACKGROUND ART

Devices configured to sense pressure are needed not only for home safety devices but also in a variety of applications using body pressure distributions. A typical pressure sensor includes a lower electrode, a middle layer disposed on the lower electrode, and an upper electrode disposed on the middle layer.

Since a thickness of the middle layer, which is a piezoresistive layer, is decreased due to an external pressure, the above-described pressure sensor may detect an applied pressure based on a variation in thickness of the middle layer. Particularly, a force sensing register (FSR) sensor, which is a thin-film-type pressure sensor, is difficult to scale up, and has reduced flexibility because conductive interconnections are printed on a thin film. Accordingly, a sheet-type pressure sensor has lately been developed.

Figure 1:
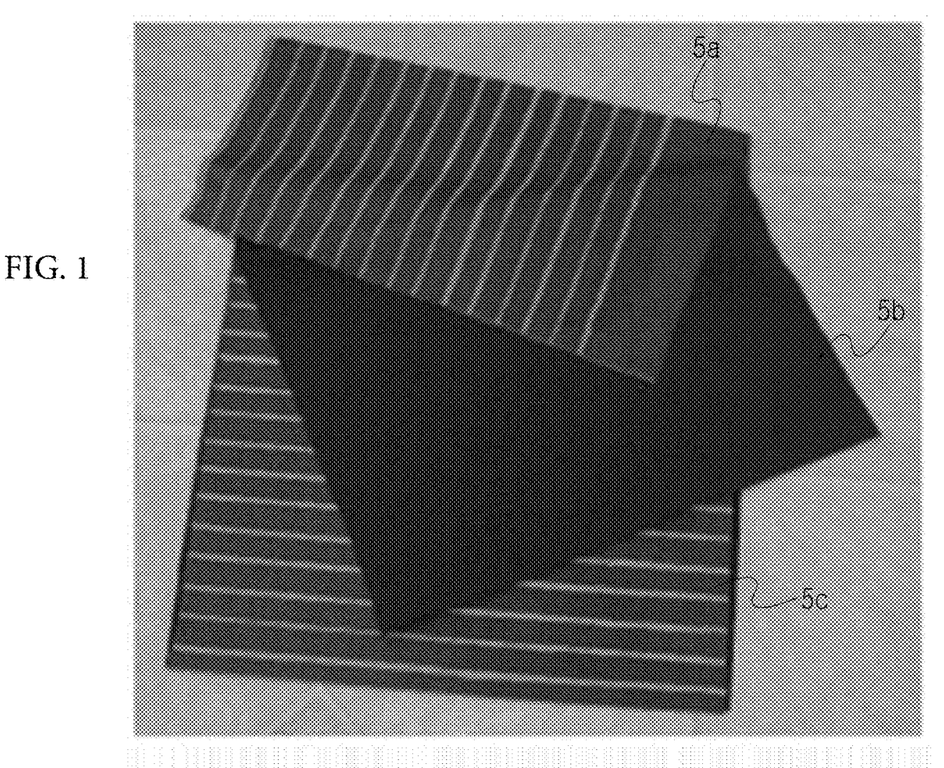
FIG. 1 is a photograph of a typical sheet-type pressure sensor.

FIG. 1 is a photograph of a typical sheet-type pressure sensor.

As shown in FIG. 1, since the typical sheet-type pressure sensor is manufactured by separately forming first and second electrode layers 5a and 5c and a middle layer 5b and adhering the first and second electrode layers 5a and 5c and the middle layer 5b to each other, manufacturing costs may increase and alignment problems may occur.

Technical Problem

The present invention is directed to providing a sheet-type integrated pressure sensor.

Technical Solution

One aspect of the present invention provides a pressure sensor formed in a sheet type and including conductive fibers, nonconductive fibers, and piezoresistive fibers, which are woven together. The pressure sensor includes a first electrode layer including the conductive fibers and the nonconductive fibers, a second electrode layer including the conductive fibers and the nonconductive fibers, and a piezoresistive layer including the piezoresistive fibers and disposed between the first electrode layer and the second electrode layer.

Another aspect of the present invention provides a pressure sensor formed in a sheet type and including conductive fibers and nonconductive fibers, which are woven together. The pressure sensor includes a first electrode layer including the conductive fibers and the nonconductive fibers, a second electrode layer including the conductive fibers and the nonconductive fibers, a piezoresistive layer including the nonconductive fibers and disposed between the first electrode layer and the second electrode layer, and a piezoresistive material layer configured to fill gaps between the conductive fibers and the nonconductive fibers.

The first electrode layer may further include the nonconductive fibers and thus include a plurality of first electrode patterns arranged in parallel in a first direction. The plurality of first electrode patterns may include the conductive fibers. The second electrode layer may include a plurality of second electrode patterns arranged in parallel in a second direction intersecting the first direction and formed of the conductive fibers.

Advantageous Effects

A pressure sensor according to an embodiment of the present invention has the following effects.

First, an integrated pressure sensor can be implemented by weaving conductive fibers, nonconductive fibers, and piezoresistive fibers together. Thus, the pressure sensor can obtain flexibility, and occurrence of alignment errors between a conductive layer and a piezoresistive layer can be inhibited, thereby improving accuracy of the pressure sensor.

Second, a sheet including a first conductive layer including conductive fibers and nonconductive fibers, a piezoresistive layer including only the nonconductive fibers, and a second conductive layer including the conductive fibers and the nonconductive fibers is formed by weaving the conductive fibers and the nonconductive fibers together, and the sheet can then be immersed in a solution containing a piezoresistive material so that piezoresistive characteristics may be given to the piezoresistive layer. Accordingly, a process of manufacturing a pressure sensor can be simplified.

MODES OF THE INVENTION

While the present invention may be modified in various ways and take on various alternative forms, specific embodiments thereof are shown in the drawings and described in detail below as examples. There is no intent to limit the present invention to the particular forms disclosed. On the contrary, the present invention is to cover all modifications, equivalents, and alternatives falling within the spirit and scope of the appended claims.

It will be understood that, although the terms first, second, etc. may be used herein to describe various elements, these elements should not be limited by these terms. The terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

Hereinafter, embodiments will be described in detail with reference to the accompanying drawings, wherein the same or corresponding elements are denoted by the same reference numerals regardless of the reference numerals, and repeated descriptions thereof will be omitted.

A pressure sensor of an embodiment will now be described in detail with reference to the accompanying drawings.

Figure 2A:
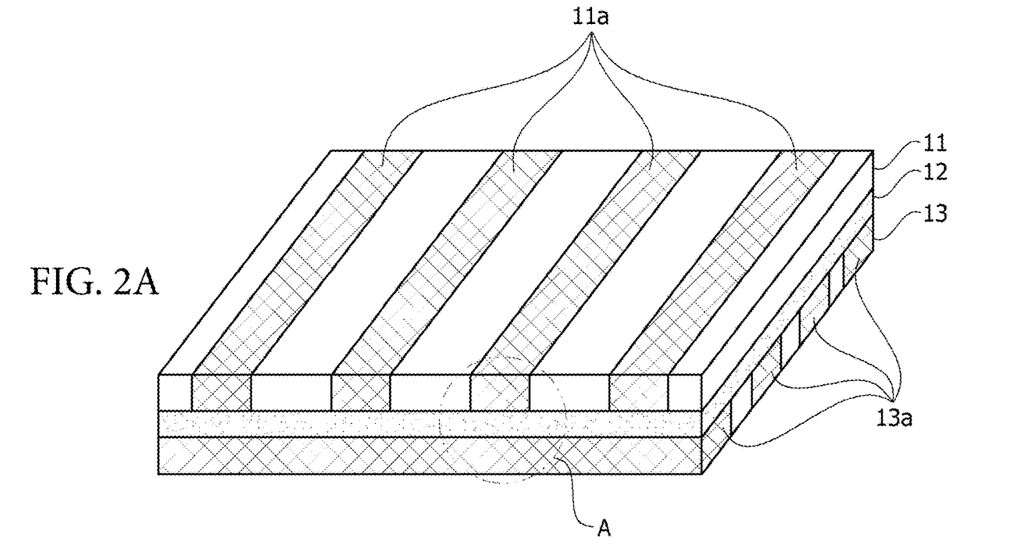
FIG. 2A is a perspective view of a pressure sensor according to an embodiment of the present invention.
Figure 2B:
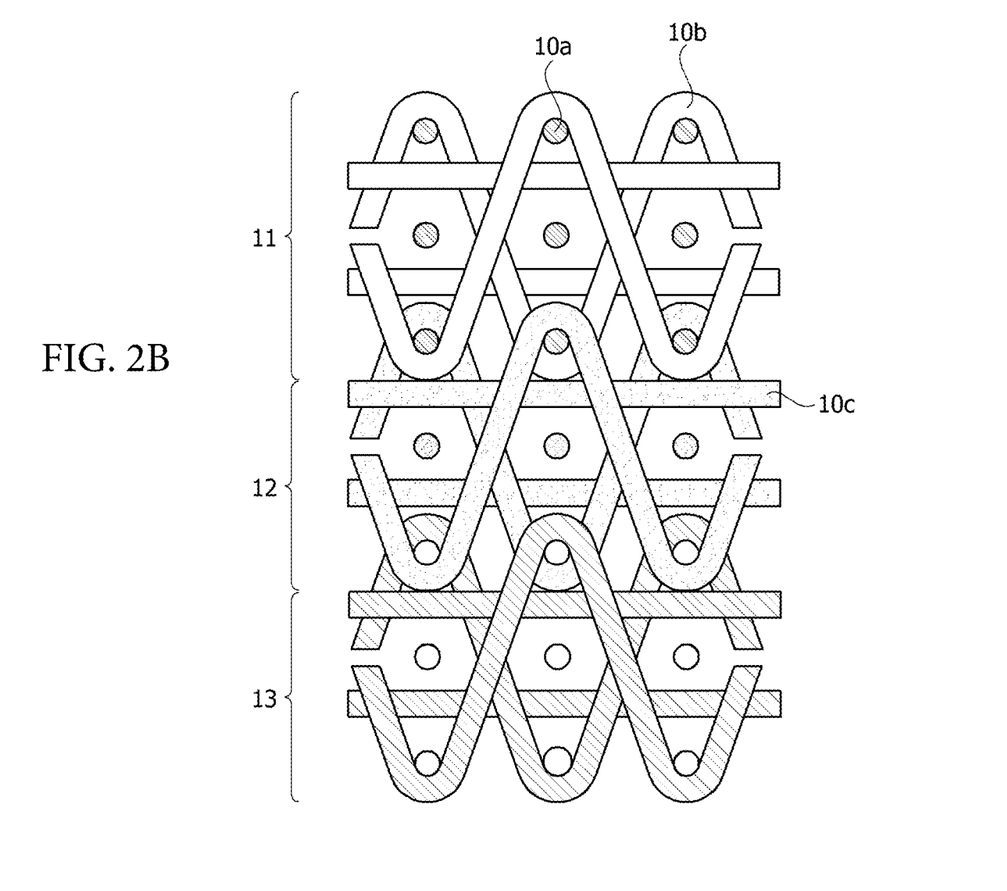
FIG. 2B is an enlarged view of region A of FIG. 2A.

FIG. 2A is a perspective view of a pressure sensor according to an embodiment of the present invention, and FIG. 2B is an enlarged view of region A of FIG. 2A.

As shown in FIG. 2A, the pressure sensor according to one embodiment of the present invention includes a first electrode layer 11, a second electrode layer 13, and a piezoresistive layer 12 disposed between the first electrode layer 11 and the second electrode layer 13. Each of the first and second electrode layers 11 and 13 has the form of a sheet including conductive fibers and nonconductive fibers, and the piezoresistive layer 12 has the form of a sheet including piezoresistive fibers. In this case, the conductive fibers, the nonconductive fibers, and the piezoresistive fibers are woven together using various methods, such as a plain weave, a twill weave, and a satin weave, so that the pressure sensor according to the embodiment of the present invention may have a structure in which the first and second electrode layers 11 and 13 and the piezoresistive layer 12 are integrally formed with each other.

Specifically, the first electrode layer 11 has a structure in which the conductive fibers and the nonconductive fibers are woven together. In particular, the first electrode layer 11 is woven such that conductive fibers are arranged in parallel in a first direction, and four first conductive patterns 11a including conductive fibers are shown in the drawing. Further, a nonconductive pattern including nonconductive fibers is exposed between adjacent first conductive patterns 11a.

Each of the conductive fibers may have a structure formed by coating a core including typical fibers, such as polyester, nylon, acryl, polypropylene, polyurethane, cotton, silk, acetate, and the like, with a conductive material, such as a metal, or may be yarn formed entirely of a conductive material. Further, the nonconductive fibers may be the above-described typical fibers.

The piezoresistive layer 12 has a structure in which piezoresistive fibers are woven. The piezoresistive fibers may be yarn formed entirely of a piezoresistive material. In this case, the piezoresistive fibers may be selected from among a carbon-containing conductive material such as carbon nanotubes (CNTs) and graphene, which is a thin film including carbon atoms arranged in a honeycomb shape, a conductive polymer such as polypyrrole (PPy) and poly(3, 4-ethylenedioxythiophene) (PEDOT), and a semiconducting inorganic metal oxide such as zinc oxide (ZnO). Further, each of the piezoresistive fibers may have a structure in which a core including the above-described typical fibers is coated with a piezoresistive material.

The second electrode layer 13 has a structure in which conductive fibers and nonconductive fibers are woven together like the first electrode layer 11. In this case, second electrode patterns 13a may be formed using the same conductive fibers as the first electrode patterns 11a. The second electrode layer 13 is formed by arranging conductive fibers in a second direction intersecting the first direction, and four second conductive patterns 13a including conductive fibers are shown in the drawing. Further, a nonconductive pattern including nonconductive fibers is exposed between adjacent second conductive patterns 13a.

Hereinafter, a process of weaving the conductive fibers, the nonconductive fibers, and the piezoresistive fibers will be described in detail.

As shown in FIG. 2B, conductive fibers 10a, nonconductive fibers 10b, and piezoresistive fibers 10c are woven together. In this case, the conductive fibers 10a, the nonconductive fibers 10b, and the piezoresistive fibers 10c may be woven together using various methods such as a plain weave, a twill weave, and a satin weave.

The conductive fibers 10a, the nonconductive fibers 10b, and the piezoresistive fibers 10c may be woven together so that the pressure sensor may be divided into the first and second electrode layers 11 and 13 and the piezoresistive layer 12 disposed between the first and second electrode layers 11 and 13. In particular, since a direction in which the first electrode patterns 11a of the first electrode layer 11 are arranged intersects a direction in which the second electrode patterns 13a of the second electrode layer 13 are arranged, when warps of the first electrode layer 11 are the nonconductive fibers 10b and wefts of the first electrode layer 11 are the conductive fibers 10a, warps of the second electrode layer 13 may be the conductive fibers 10a, and wefts of the second electrode layer 13 may be the nonconductive fibers 10b. However, the present invention is not limited thereto.

In addition, although a structure in which the conductive fibers 10a and the nonconductive fibers 10b of the first and second electrode layers 11 and 13 are regularly woven is shown in the drawing, the conductive fibers 10a and the nonconductive fibers 10b may be irregularly woven so that the first and second electrode patterns 11a and 13a may have wave shapes instead of bar shapes.

The piezoresistive layer 12 may include only the piezoresistive fibers 10c. The piezoresistive fibers 10c may be woven together with the conductive fibers 10a and the nonconductive fibers 10b of adjacent first and second electrode layers 11 and 13 so that the piezoresistive layer 12 may be disposed between the first and second electrode layers 11 and 13.

That is, as described above, in the present invention, a sheet-type pressure sensor may be implemented by weaving the conductive fibers 10a, the nonconductive fibers 10b, and the piezoresistive fibers 10c together. Thus, the pressure sensor may obtain flexibility, and occurrence of alignment errors between the first and second electrode layers 11 and 13 and the piezoresistive layer 12 may be inhibited, thereby improving accuracy of the pressure sensor.

Figure 3A:
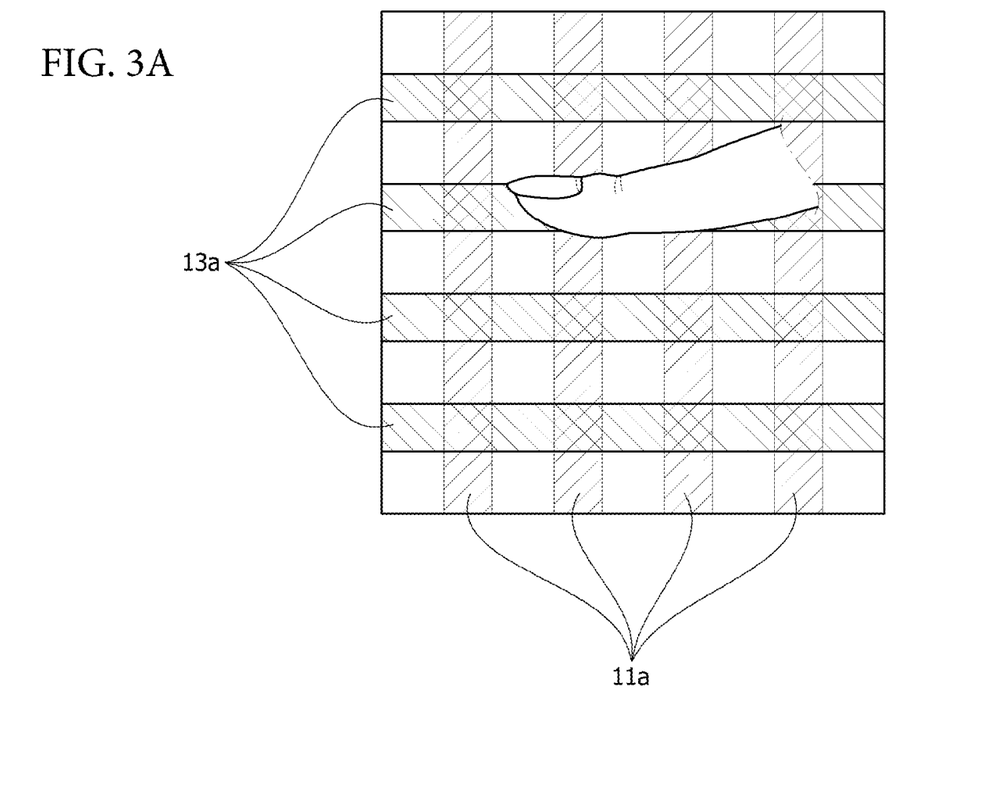
FIG. 3A is a plan view showing pressure sensing according to an embodiment of the present invention.
Figure 3B:
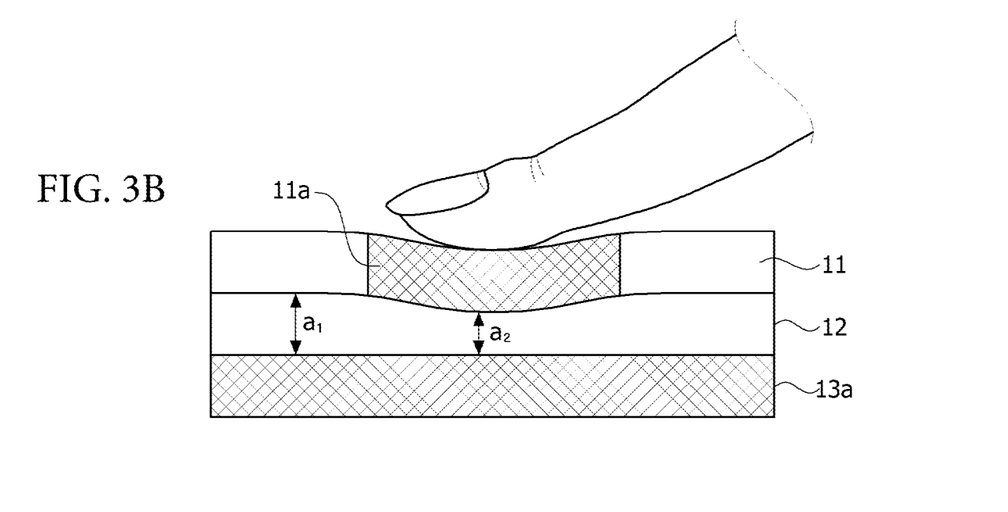
FIG. 3B is a cross-sectional view showing pressure sensing shown in FIG. 3A.

FIG. 3A is a plan view showing pressure sensing according to an embodiment of the present invention. FIG. 3B is a cross-sectional view showing pressure sensing shown in FIG. 3A.

As shown in FIGS. 3A and 3B, when pressure is applied to a pressure sensor according to an embodiment of the present invention, a thickness a2 of a piezoresistive layer 12 in a region to which the pressure is applied becomes smaller than a thickness a1 of the piezoresistive layer 12 in a region to which the pressure is not applied. Thus, a piezoresistance of the piezoresistive layer 12 may be reduced in the region to which the pressure is applied, so that the pressure sensor can detect pressure.

In particular, the piezoresistive layer 12 may be formed by coating a region woven using a nonconductive material, which is not piezoelectric fibers, with a piezoresistive material.

Figure 4:
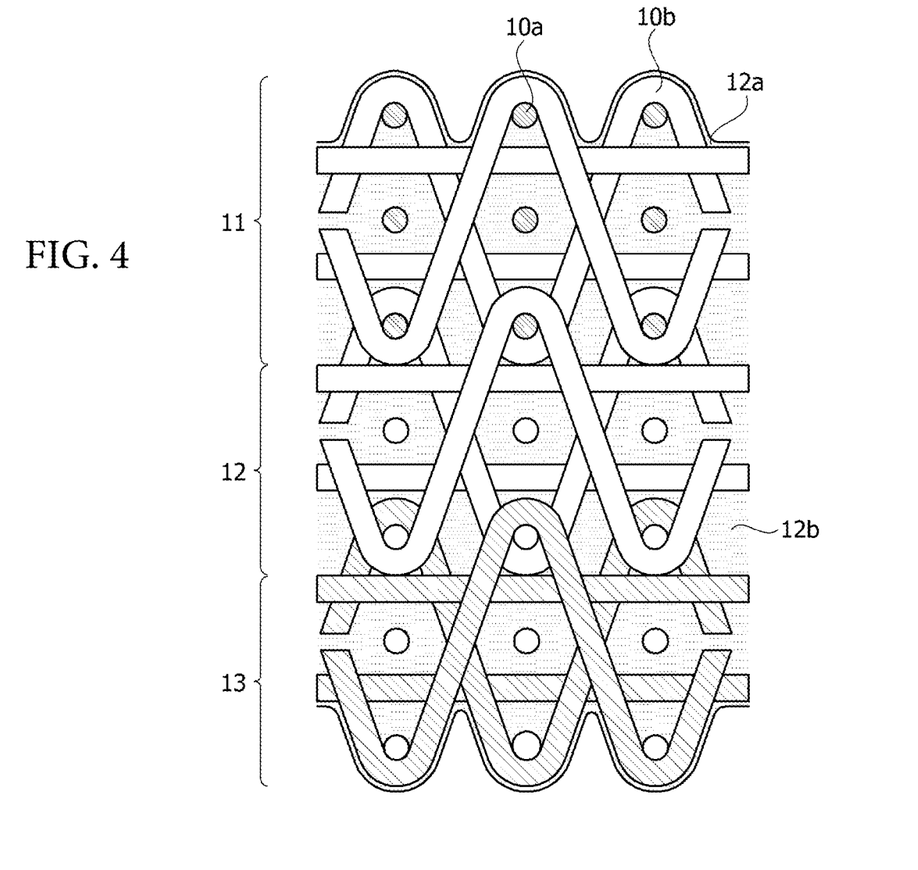
FIG. 4 is an enlarged view of region A of FIG. 2A, according to another embodiment of the present invention.

FIG. 4 is an enlarged view of region A of FIG. 2A, according to another embodiment of the present invention.

As shown in FIG. 4, a pressure sensor according to another embodiment of the present invention may form a sheet including a first conductive layer 11 formed by weaving conductive fibers 10a and nonconductive fibers 10b, a piezoresistive layer 12 including nonconductive fibers 10b, and a second conductive layer 13 including the conductive fibers 10a and the nonconductive fibers 10b. Further, the sheet may be immersed in a solution containing a piezoresistive material so that piezoresistive characteristics may be given to the piezoresistive layer 12. Thereafter, the sheet may be dried to manufacture the pressure sensor.

When the sheet is immersed in the solution containing the piezoresistive material, a piezoresistive coating film 12a may be formed by coating a surface of the sheet with the piezoresistive material, and a piezoresistive material layer 12b may be formed by filling the inside of the sheet with the piezoresistive material. That is, the piezoresistive material layer 12b is absorbed into the sheet and fills gaps between the conductive fibers 10a and the nonconductive fibers 10b. In this case, as compared with the pressure sensor of FIG. 2B, a resistance between the first and second electrode layers 11 and 13 and the piezoresistive layer 12 may be reduced, and the uniformity of a sheet resistance may be improved. Particularly, since only the conductive fibers 10a and the nonconductive fibers 10b are used, the manufacturing process is simpler than a process using the conductive fibers 10a, the nonconductive fibers 10b, and piezoresistive fibers.

Particularly, in the case of FIG. 4, a surface resistance of each of the piezoresistive coating film 12a and the piezoresistive material layer 12b may be in a range of 100 Ω/square to 10 MΩ/square. Further, a vertical resistance of each of the piezoresistive coating film 12a and the piezoresistive material layer 12b may also be in a range of 100 Ω/square to 10 MΩ/square. When each of the piezoresistive coating film 12a and the piezoresistive material layer 12b has an excessively low surface resistance, separated electrode patterns may be electrically connected to each other through the piezoresistive coating film 12a. In addition, when each of the piezoresistive coating film 12a and the piezoresistive material layer 12b has an excessively high surface resistance, each of the piezoresistive coating film 12a and the piezoresistive material layer 12b nearly functions as an insulator. Accordingly, as described above, a surface of each of the piezoresistive coating film 12a and the piezoresistive material layer 12b may be in a range of 100 Ω/square to 10 MΩ/square.

Hereinafter, a pressure sensor according to still another embodiment of the present invention will be described in detail.

Figure 5A:
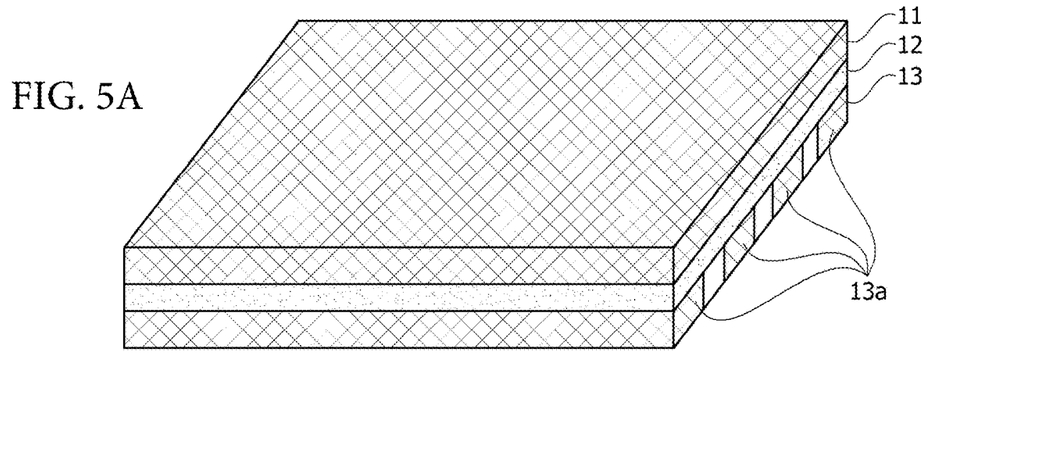
FIGS. 5A and 5B are perspective views of a pressure sensor according to another embodiment of the present invention.
Figure 5B:
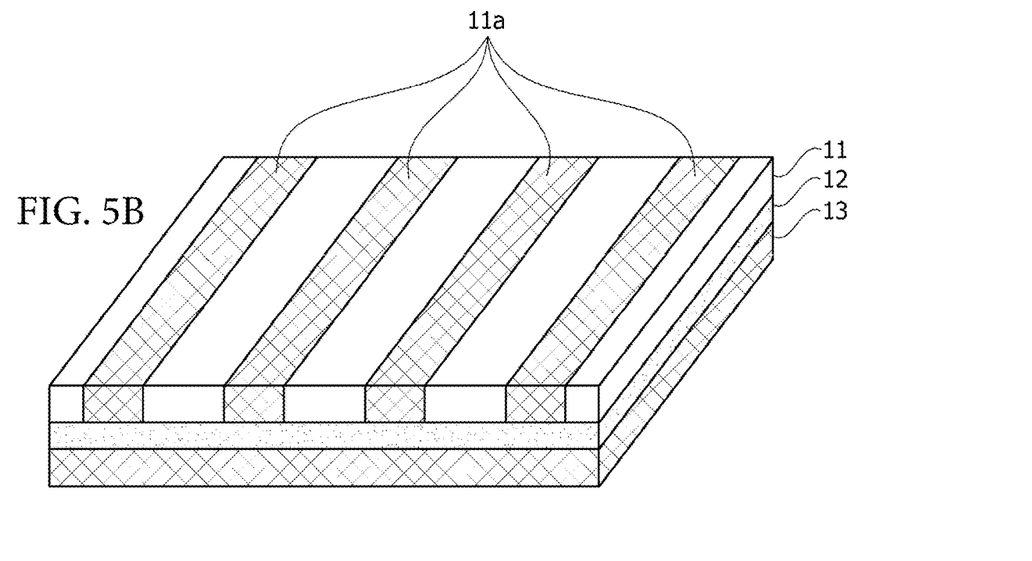

FIGS. 5A and 5B are perspective views of a pressure sensor according to still another embodiment of the present invention.

As shown in FIG. 5A, in the pressure sensor according to still another embodiment of the present invention, a first electrode layer 11 is formed to have an integrated structure. That is, the first electrode layer 11 may not include a plurality of first electrode patterns arranged in a first direction, but may entirely overlap a piezoresistive layer 12 and be integrally formed with the piezoresistive layer 12. In this case, the first electrode layer 11 includes only conductive fibers, and the second electrode layer 13 includes conductive fibers and nonconductive fibers and thus includes a plurality of second electrode patterns 13a arranged in the first direction or the second direction of FIG. 2A. Accordingly, a piezoresistance of the piezoresistive layer 12 may be changed in a region where the first electrode layer 11 overlaps the second electrode patterns 13a due to an external pressure so that the pressure sensor may detect a pressure.

In addition, as shown in FIG. 5B, the second electrode layer 13 may entirely overlap the piezoresistive layer 12 and be integrally formed with the piezoresistive layer 12. In this case, the second electrode layer 13 may include only conductive fibers, and the first electrode layer 11 may include conductive fibers and nonconductive fibers and thus include a plurality of first electrode patterns 11a arranged in the first direction or the second direction of FIG. 2A.

As described above, a pressure sensor of the present invention can obtain only advantages of an FSR sensor and a typical sheet-type pressure sensor. Specifically, although the FSR sensor in which a conductive pattern is printed on a film is difficult to scale up and has low flexibility, the FSR sensor can inhibit alignment problems. Although the typical sheet-type pressure sensor has flexibility, since a first electrode layer, a piezoresistive layer, and a second electrode layer are individually formed and adhered to each other, alignment problems may occur.

In contrast, the present invention can implement a sheet-type pressure sensor by weaving the conductive fibers 10a, the nonconductive fibers 10b, and the piezoresistive fibers 10c together. Accordingly, the pressure sensor can obtain flexibility and enable scaling-up.

While the present invention has been particularly shown and described with reference to exemplary embodiments thereof, it will be understood by those of ordinary skill in the art that various changes in form and details may be made therein without departing from the spirit and scope thereof as defined by the following claims.

The invention claimed is:

1. A pressure sensor formed in a sheet type and including conductive fibers, nonconductive fibers, and piezoresistive fibers, which are woven together, the pressure sensor comprising:

a first electrode layer comprising the conductive fibers and the nonconductive fibers;

a second electrode layer comprising the conductive fibers and the nonconductive fibers; and a piezoresistive layer comprising the piezoresistive fibers and disposed between the first electrode layer and the second electrode layer, wherein the nonconductive fibers of the first electrode layer and the conductive fibers of the second electrode layer are formed as warps, while the conductive fibers of the first electrode layer and the nonconductive fibers of the second electrode layer are formed as wefts; and wherein each of the piezoresistive fibers comprises a nonconductive fiber filled by a piezoresistive material.

2. The pressure sensor of claim 1, wherein the first electrode layer comprises a plurality of first electrode patterns arranged in parallel in a first direction and formed of the conductive fibers.

3. The pressure sensor of claim 1, wherein:
the first electrode layer comprises the nonconductive fibers and a plurality of first electrode patterns arranged in parallel in a first direction and formed of the conductive fibers; and
the second electrode layer comprises a plurality of second electrode patterns arranged in parallel in a second direction intersecting the first direction and formed of the conductive fibers.

4. The pressure sensor of claim 1, wherein each of the piezoresistive fibers comprises a core and a piezoresistive material with which an outer surface of the core is coated.

5. The pressure sensor of claim 4, wherein the piezoresistive material comprises a material selected from among a carbon material, a conductive polymer, and a semiconducting inorganic metal oxide.

6. The pressure sensor of claim 1, wherein the piezoresistive material comprises a material selected from among a carbon material, a conductive polymer, and a semiconducting inorganic metal oxide.

7. The pressure sensor of claim 1, wherein the conductive fibers are formed entirely of a conductive material.

8. The pressure sensor of claim 1, wherein each of the conductive fibers comprises a core and a conductive material with which an outer surface of the core is coated.

9. The pressure sensor of claim 1, wherein the nonconductive fibers comprise a material selected from among polyester, nylon, acryl, polypropylene, polyurethane, cotton, silk, and acetate.

10. A pressure sensor formed in a sheet type and including conductive fibers and nonconductive fibers, which are woven together, the pressure sensor comprising:
a first electrode layer comprising the conductive fibers and the nonconductive fibers;
a second electrode layer comprising the conductive fibers and the nonconductive fibers;
a piezoresistive layer comprising the nonconductive fibers and disposed between the first electrode layer and the second electrode layer; and
a piezoresistive material layer configured to fill gaps between the conductive fibers and the nonconductive fibers,
wherein the nonconductive fibers of the first electrode layer and the conductive fibers of the second electrode layer are formed as warps, while the conductive fibers of the first electrode layer and the nonconductive fibers of the second electrode layer are formed as wefts; and
wherein the piezoresistive material layer comprises nonconductive material filled by a piezoresistive material.

11. The pressure sensor of claim 10, comprising a piezoresistive coating film with which outer side surfaces of the first electrode layer and the second electrode layer are coated.

12. The pressure sensor of claim 11, wherein a surface resistance of each of the piezoresistive coating film and the piezoresistive material layer is in a range of 100 Ω/square to 10 MΩ/square.

13. The pressure sensor of claim 10, wherein the first electrode layer comprises a plurality of first electrode patterns arranged in parallel in a first direction and formed of the conductive fibers.

14. The pressure sensor of claim 10, wherein:
the first electrode layer comprises the nonconductive fibers and a plurality of first electrode patterns arranged in parallel in a first direction and formed of the conductive fibers; and
the second electrode layer comprises a plurality of second electrode patterns arranged in parallel in a second direction intersecting the first direction and formed of the conductive fibers.

15. The pressure sensor of claim 10, wherein the piezoresistive material layer comprises a core and a piezoresistive material with which an outer surface of the core is coated.

16. The pressure sensor of claim 15, wherein the piezoresistive material comprises a material selected from among a carbon material, a conductive polymer, and a semiconducting inorganic metal oxide.

17. The pressure sensor of claim 10, wherein the piezoresistive material comprises a material selected from among a carbon material, a conductive polymer, and a semiconducting inorganic metal oxide.

18. The pressure sensor of claim 10, wherein the conductive fibers are formed entirely of a conductive material.

19. The pressure sensor of claim 10, wherein each of the conductive fibers comprises a core and a conductive material with which an outer surface of the core is coated.

20. The pressure sensor of claim 10, wherein each of the nonconductive fibers comprises a material selected from among polyester, nylon, acryl, polypropylene, polyurethane, cotton, silk, and acetate.

* * * * *